(12) United States Patent
Kobayashi (10) Patent No.: US 9,985,479 B2
(45) Date of Patent: May 29, 2018

(54) INFORMATION COLLECTION CIRCUIT AND INFORMATION COLLECTION MODULE

(71) Applicant: Shinko Electric Industries Co., LTD., Nagano-ken (JP)

(72) Inventor: Tomoki Kobayashi, Nagano-shi (JP)

(73) Assignee: Shinko Electric Industries Co., LTD., Nagano-Ken (JP)

( * ) Notice: Subject to any disclaimer, the term of this patent is extended or adjusted under 35 U.S.C. 154(b) by 98 days.

(21) Appl. No.: 15/149,058

(22) Filed: May 6, 2016

(65) Prior Publication Data
US 2016/0336802 A1 Nov. 17, 2016

(30) Foreign Application Priority Data
May 13, 2015 (JP) .................................. 2015-098264

(51) Int. Cl.
*H02J 50/10* (2016.01)
*H02J 7/02* (2016.01)

(52) U.S. Cl.
CPC .............. *H02J 50/10* (2016.02); *H02J 7/025* (2013.01)

(58) Field of Classification Search
CPC ..................... H02J 50/10; H02J 7/025

USPC ......................................................... 307/104
See application file for complete search history.

(56) References Cited

U.S. PATENT DOCUMENTS

2014/0266105 A1* 9/2014 Li ........................... G05F 1/565
323/280

FOREIGN PATENT DOCUMENTS

JP 2006086584 A 3/2006
WO WO2014/112019 * 7/2014 ............... H02J 7/02

* cited by examiner

*Primary Examiner* — John Poos
(74) *Attorney, Agent, or Firm* — Wolf, Greenfield & Sacks, P.C.

(57) ABSTRACT

An information collection circuit includes a control circuit, which collects information of a measurement subject from a detection circuit, and a rectification circuit, which rectifies electromotive force. A first switch, coupled between the rectification circuit and the control circuit, becomes conductive based on DC voltage generated by the rectification circuit. A second switch, coupled between the control circuit and a battery, becomes conductive based on a control signal provided from the control circuit. The second switch is non-conductive when the control circuit is inactive. The control circuit is activated by a first power voltage supplied via the first switch to control the second switch to become conductive, and is operated based on a second power voltage supplied from the battery via the conductive second switch.

7 Claims, 7 Drawing Sheets

INFORMATION COLLECTION CIRCUIT AND INFORMATION COLLECTION MODULE

CROSS-REFERENCE TO RELATED APPLICATIONS

This application is based upon and claims the benefit of priority from prior Japanese Patent Application No. 2015-098264, filed on May 13, 2015, the entire contents of which are incorporated herein by reference.

FIELD

This disclosure relates to an information collection circuit and an information collection module.

BACKGROUND

An electronic device such as a portable terminal is used as an information collection device that collects various types of information outdoors or as a wearable computer provided with various types of services. A typical electronic device includes a power switch used to turn on the power. When an electronic device is used outdoors, water or the like may enter the electronic device through the power switch, which is exposed from the electronic device. This may corrode metal portions such as terminals. Japanese Laid-Open Patent Publication No. 2006-86584 describes an electronic device including a receiver that receives radio waves to activate and deactivate a power supply in accordance with whether or not radio waves are received.

A receiver, such as that described above, receives radio waves from a corresponding transmitter but may also receive similar radio waves from other transmitters. Such radio waves produce noise in the receiver. This may activate or deactivate the power supply in an unintentional manner and cause erroneous operation of the electronic device. Thus, there is a need to reduce noise that causes erroneous operations.

SUMMARY

One aspect is an information collection circuit that collects information of a measurement subject. The information collection circuit includes a detection circuit that generates a detection signal in accordance with the information of the measurement subject. A control circuit that collects the information of the measurement subject from the detection signal of the detection circuit. A rectification circuit rectifies electromotive force generated at a coil by an external magnetic field or an external electric field. A first semiconductor switch is coupled between the rectification circuit and a power terminal of the control circuit. The first semiconductor switch becomes conductive based on a DC voltage generated by the rectification circuit. A second semiconductor switch is coupled between the power terminal of the control circuit and a battery. The second semiconductor switch becomes conductive based on a control signal provided from the control circuit to a control terminal of the second semiconductor switch. The second semiconductor switch is non-conductive when the control circuit is inactive. The control circuit is activated by a first power voltage supplied via the first semiconductor switch to control the second semiconductor switch to become conductive, and the control circuit is operated based on a second power voltage supplied from the battery via the conductive second semiconductor switch to collect the information of the measurement subject.

Other aspects and advantages of the embodiments will become apparent from the following description, taken in conjunction with the accompanying drawings, illustrating by way of example the principles of the invention.

It is to be understood that both the foregoing general description and the following detailed description are exemplary and explanatory and are not restrictive of the invention, as claimed.

BRIEF DESCRIPTION OF THE DRAWINGS

The embodiments, together with objects and advantages thereof, may best be understood by reference to the following description of the presently preferred embodiments together with the accompanying drawings in which.

DESCRIPTION OF THE EMBODIMENTS

Embodiments will now be described with reference to the drawings. In the drawings, elements are illustrated for simplicity and clarity and have not necessarily been drawn to scale.

First Embodiment

A first embodiment will now be described.

Figure 1:
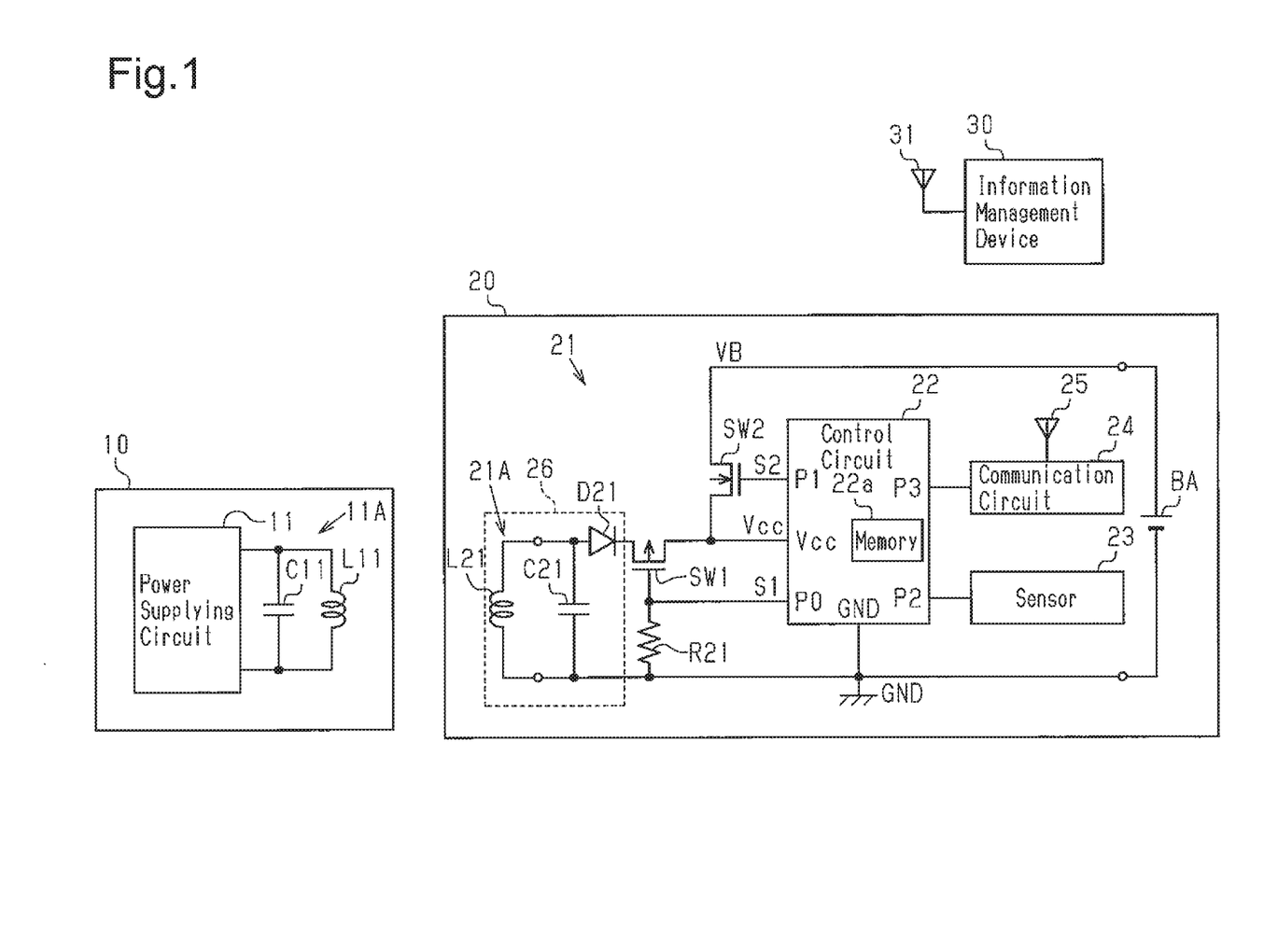
FIG. 1 is a schematic block circuit diagram illustrating a first embodiment of an information collection system.

As illustrated in FIG. 1, an information collection system includes an activation device 10, an information collection device 20, and an information management device 30.

The information collection device 20 is activated when supplied with power through contactless transfer from the activation device 10. Thus, the activation device 10 functions as an activation switch (power switch) of the information collection device 20. The activated information collection device 20 is operated by power voltage Vcc supplied in accordance with the battery voltage VB of a battery BA. The information collection device 20 is continuously operated by the power of the battery BA. The information collection device 20 incorporates a sensor 23, which serves as a detection circuit, to collect information of a measurement subject with the sensor 23 and transmit the collected information through wireless communication. The battery BA is, for example, a button primary battery or a coin-shaped primary battery. A box-shaped battery may also be used as the battery BA. Further, the battery BA may be a secondary battery (i.e., rechargeable battery).

The information management device 30 includes an antenna 31 and receives information transmitted from the information collection device 20. The information management device 30 stores the received information in a storage device (HDD or the like). For example, unique identification information (ID) is assigned to the information collection device 20. Accordingly, different information collection devices 20 may be distinguished from one another by different identification information (IDs). The information collection device 20 transmits transmission information that includes the identification information and the collected information (e.g., biological information). The information management device 30 stores the received information, that is, the identification information and the biological information.

The activation device 10 includes a power supplying circuit 11, a coil L11, and a capacitor C11. The output terminals of the power supplying circuit 11 are coupled to the two terminals of the coil L11. The capacitor C11 is coupled in parallel to the coil L11. The power supplying circuit 11 supplies the coil L11 with AC power having a given frequency. The coil L11 and the capacitor C11 form a resonance circuit 11A. The frequency of the AC power is set to the resonance frequency of the resonance circuit 11A, for example, 10 MHz. The resonance frequency is based on the inductance of the coil L11 and the capacitance of the capacitor C11.

The information collection device 20 includes a coil L21 coupled to an information collection circuit 21. The coil L21 includes a first terminal coupled to the anode of a diode D21, which serves as a rectification circuit, and a second terminal coupled to a low potential voltage wiring (ground GND). The coil L21 is coupled in parallel to a capacitor C21. The cathode of the diode D21 is coupled to a power terminal Vcc of a control circuit 22 via a switch SW1. The coil L21 and the capacitor C21 form a resonance circuit 21A. The resonance frequency of the resonance circuit 21A is set to be equal to the resonance frequency of the resonance circuit 11A in the activation device 10 based on the inductance of the coil L21 and the capacitance of the capacitor C21.

The switch SW1 is, for example, a P-channel MOS transistor and is one example of a first semiconductor switch. The switch SW1 includes a first terminal (e.g., source terminal) coupled to the cathode of the diode D21, a second terminal (e.g., drain terminal) coupled to the power terminal Vcc of the control circuit 22, and a control terminal (gate terminal) coupled to a first terminal of a resistor R21. The resistor R21 includes a second terminal coupled to ground GND.

The control terminal of the switch SW1 is coupled to port P0 of the control circuit 22. The control circuit 22 is, for example, a microcontroller including arithmetic circuits and peripheral circuits. The control circuit 22 includes a memory 22a that stores operation programs of the control circuit 22, primary data used for operations, identification information (ID), and the like. The collected information may be stored in the memory 22a.

The control circuit 22, which is activated by the power voltage supplied to the power terminal Vcc (voltage applied to power terminal Vcc, hereafter referred to as the power voltage Vcc using the same reference character), executes the operation programs stored in the memory 22a. The control circuit 22 generates a control signal S1 in accordance with the operation state. The switch SW1 goes ON or OFF in response to the control signal S1.

The power terminal Vcc of the control circuit 22 is also coupled to a switch SW2. The switch SW2 is, for example, an N-channel MOS transistor and is one example of a second semiconductor switch. The switch SW2 includes a first terminal (e.g., drain terminal) coupled to a positive terminal of the battery BA. A negative terminal of the battery BA is coupled to ground GND.

Further, the switch SW2 includes a second terminal (e.g., source terminal) that is coupled to the power terminal Vcc of the control circuit 22 and a control terminal (gate terminal) that is coupled to port P1 of the control circuit 22. The control circuit 22 generates a control signal S2 in accordance with the operation state. The switch SW2 goes ON or OFF in response to the control signal S2.

Port P2 of the control circuit 22 is coupled to the sensor 23, which is, for example, a temperature sensor. For example, the information collection device 20 collects biological information and is attached to a human body, which serves as a measurement subject. In this case, the sensor 23 detects the body temperature of the human body as the biological information (information of measurement subject) and generates a detection signal in accordance with the detected temperature. The control circuit 22 collects the biological information (i.e., body temperature) from the detection signal of the sensor 23.

In lieu of, or in addition to, the body temperature, the electrical activity of the heart (electrocardiogram), pulse, brain waves, respiratory rate, perspiration, and the like may be collected as the biological information. FIG. 1 illustrates only one sensor 23. However, a plurality of sensors 23 may be coupled to the control circuit 22 in accordance with the type of the collected information or the location where the information is collected.

Port P3 of the control circuit 22 is coupled to a communication circuit 24. An antenna 25 is coupled to the communication circuit 24, which is, for example, a transmission circuit. The control circuit 22 sends transmission information, which includes the biological information collected by the sensor 23, to the communication circuit 24. The communication circuit 24 transmits the transmission information from the antenna 25. The communication circuit 24 transmits signals at a frequency of, for example, 2.4 GHz.

A process for activating the information collection device 20 will now be described.

When the battery BA is not coupled, the control circuit 22 is not supplied with the power voltage Vcc (Vcc=0) and is thus inactive.

When the battery BA is coupled, the battery voltage VB is supplied to the switch SW2. Since the control circuit 22 is inactive, the gate voltage at the switch SW2 has a low level (ground GND level). Thus, the switch SW2 is turned OFF.

The activation device 10 supplies AC power to the coil L11 from the power supplying circuit 11 constantly or when a switch (not illustrated) of the activation device 10 is operated. The AC power generates electromotive force (AC power) at the coil L21 of the information collection device 20. The diode D21 rectifies the AC power and generates DC power (i.e., DC voltage), which is supplied to the switch SW1.

The control terminal (gate terminal) of the switch SW1, which is a P-channel MOS transistor, is coupled to ground GND via the resistor R21. Thus, when the control circuit 22 is inactive, the switch SW1 is turned ON. The switch SW1, which is a P-channel MOS transistor, goes ON and OFF in accordance with the potential difference between the gate terminal and the source terminal. The first terminal of the switch SW1 (source terminal of transistor) is supplied with DC power obtained by smoothing the electromotive force generated at the coil L21. The switch SW1 goes ON (becomes conductive) when supplied with DC power. That is, when electromotive force is not generated at the coil L21 (and the control circuit 22 is inactive and not controlling the switch SW1), the switch SW1 is enabled to go ON. An ON state (conductive state) of the switch SW1 includes the ON-enabled state. The DC power is supplied to the power terminal Vcc of the control circuit 22 via the switch SW1 that is in the ON state (conductive state). In this manner, the control circuit 22 is activated by the DC power (first power voltage) supplied via the switch SW1.

The activated control circuit 22 outputs the control signal S2 at a given voltage Vh from port P1. The voltage Vh of the control signal S2 has a level that keeps the switch SW2 turned ON. In the first embodiment, the switch SW2 is an N-channel MOS transistor. Accordingly, the control circuit 22 generates the control signal S2 having a voltage Vth that is higher than the voltage at the first terminal of the switch SW2 (in the present example, battery voltage VB supplied to drain terminal) by a threshold value voltage Vthn of the switch SW2. For example, the control circuit 22 includes a step-up circuit that generates the necessary voltage. The step-up circuit may be, for example, a switching circuit, a charge pump circuit, or a bootstrap circuit.

The switch SW2 goes ON in response to the control signal S2 (voltage Vh). Accordingly, the control circuit 22 is supplied with power voltage Vcc (second power voltage), which corresponds to the battery voltage VB of the battery BA, via the switch SW2 that is turned ON. The power voltage Vcc (battery voltage VB) continuously operates the control circuit 22.

The control circuit 22 generates the control signal S1 at a given voltage level. For example, the voltage level of the control signal S1 is equal to the level of the voltage Vh of the control signal S2. The switch SW1 goes OFF in response to the control signal S1 having the voltage Vh. The voltage level of the control signal S1 may be the level of the power voltage Vcc. When the switch SW1 goes OFF, an activation circuit 26, which includes the coil L21, the capacitor C21, and the diode D21, is electrically decoupled from the power terminal Vcc of the control circuit 22. In other words, the control circuit 22 is activated by the power voltage Vcc supplied from the activation circuit 26. Subsequent to activation, the control circuit 22 electrically decouples the activation circuit 26 from the power terminal Vcc.

The operational states of the information collection device 20 will now be described.

Figure 2:
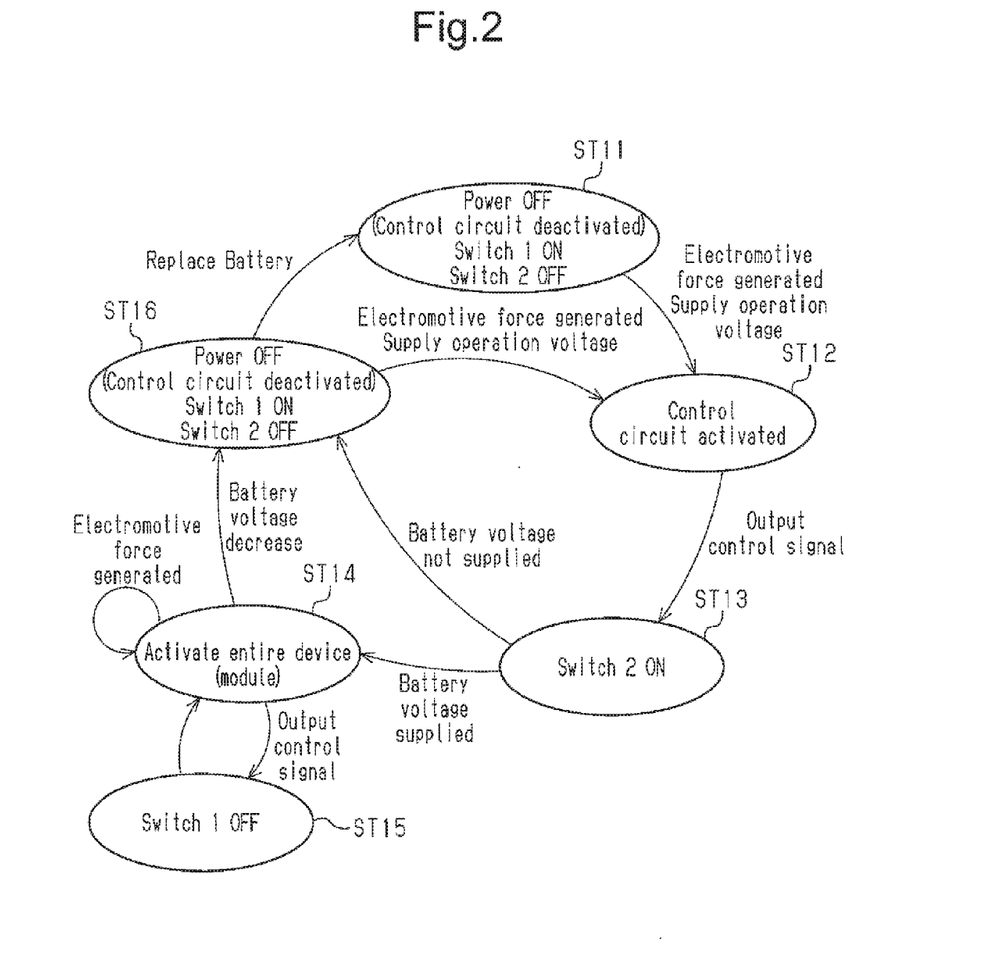
FIG. 2 is a chart illustrating the operation of an information collection device illustrated in FIG. 1.

In FIG. 2, state ST11 indicates an initial state. In this state, the power supply of the information collection device 20 is deactivated. Accordingly, the switches SW1 and SW2 illustrated in FIG. 1 are in a non-controlled state. In FIG. 2, the switch SW1 is indicated as "Switch 1", and the switch SW2 is indicated as "Switch 2". The control terminal of the switch SW1 is coupled to ground GND via the resistor R21. Thus, the switch SW1 is in an ON-enabled state. Accordingly, the switch SW1 is in an ON state as described above. The switch SW2 is turned OFF. Further, in this state, the battery BA of the information collection device 20 is able to supply the control circuit 22 and the like with sufficient (operation enabling) battery voltage VB.

When electromotive force is generated at the coil L21, the electromotive force (DC power) activates the control circuit 22 (state ST12). The activated control circuit 22 outputs the control signal S2 having the voltage Vh, and the control signal S2 turns on the switch SW2 (state ST13).

The battery BA supplies the control circuit 22 with the battery voltage VB via the switch SW2 that has been turned ON. The power voltage Vcc, which corresponds to the battery voltage VB, activates the entire information collection device 20 (state ST14). The control circuit 22 outputs the control signal S1 having the voltage Vh, and the control signal S1 turns OFF the switch SW1 (state ST15). Then, the information collection device 20 shifts to state ST14.

In state ST14, the control circuit 22 of the information collection device 20 transmits the information collected by the sensor 23 from the communication circuit 24 and the antenna 25.

Further, in state ST14, noise may generate electromotive force at the coil L21. However, the switch SW1 between the coil L21 (activation circuit 26) and the control circuit 22 is turned OFF. Thus, the control circuit 22 is not affected by the electromotive force. That is, the control circuit 22 stably operates in state ST14.

When the battery voltage VB decreases to be lower than the operable voltage range of the control circuit 22, the information collection device 20 shifts to state ST16 and deactivates the power supply. In state ST16, the control circuit 22 is deactivated. Accordingly, the switches SW1 and SW2 are in a non-controlled state. The switch SW1 goes ON, and the switch SW2 goes OFF.

In the deactivated state (state ST16), noise may generate electromotive force at the coil L21. In such a case, the information collection device 20 shifts to state ST12 and activates the control circuit 22 with the electromotive force. The activated control circuit 22 outputs the control signal S2 having the voltage Vh, and the switch SW2 goes ON. However, the control circuit 22 is not supplied with the battery voltage VB via the switch SW2. Thus, the information collection device 20 shifts to state ST16, and the power supply is deactivated.

In step ST16, when the battery BA is replaced, the information collection device 20 shifts to state ST11 (initial state). The battery replacement replaces a used battery with a new primary battery or a charged secondary battery. In this manner, the information collection device 20 is reused by replacing the battery BA. When the battery BA is a secondary battery, the battery BA is removed from a wiring substrate 40 (refer to FIG. 3A) of the information collection device 20, recharged, and then attached to the wiring substrate 40 again. Alternatively, the battery BA (secondary battery) may be charged in a state attached to the wiring substrate 40.

Figure 3A:
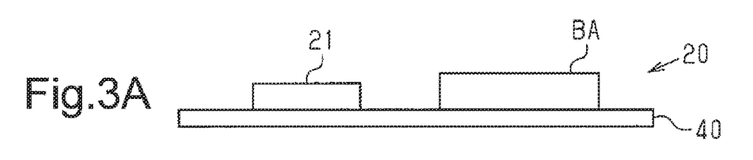
FIG. 3A is a schematic side view of the information collection device illustrated in FIG. 1.

Referring to FIG. 3A, the information collection device 20 serves as, for example, an information collection module including the wiring substrate 40. The wiring substrate 40 may be formed from, for example, an insulative resin such as an epoxy resin or an insulative resin including a filler such as glass. The wiring substrate 40 may be a resin film of polyamide or the like including wiring layers.

The information collection circuit 21 is formed on the upper surface of the wiring substrate 40. FIG. 3A illustrates the information collection circuit 21 as a single tetragon. However, discrete components such as the capacitor C21 and the diode D21, which are illustrated in FIG. 1, may be mounted on the wiring substrate 40. Alternatively, a single semiconductor chip including the capacitor C21 and the diode D21 may be mounted on the wiring substrate 40. The battery BA is also mounted on the upper surface of the wiring substrate 40. The wiring substrate 40 includes wiring patterns (not illustrated) that electrically couple the battery BA to the control circuit 22 and the coil L21.

Figure 3B:
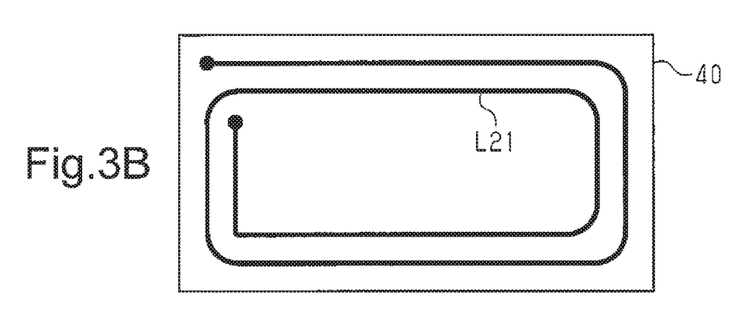
FIG. 3B is a schematic lower view of the information collection device illustrated in FIG. 1.

As illustrated in FIG. 3B, the coil L21 is formed by a wiring pattern on the lower surface of the wiring substrate 40. An electrode or the like used by the information collection device 20 to collect information may be formed on the lower surface of the wiring substrate 40.

Application

Figure 4A:
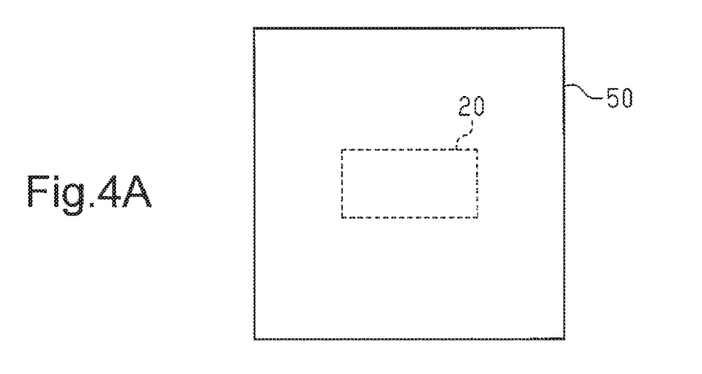
FIG. 4A is a schematic plan view illustrating an application of the information collection device illustrated in FIG. 1.

Referring to FIG. 4A, the information collection device 20 (module) is attached to the measurement subject (e.g., human body) by a bonding film 50.

Figure 4B:
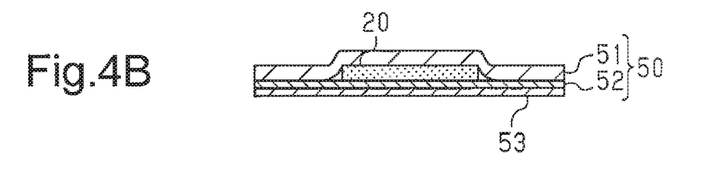
FIG. 4B is a cross-sectional view of FIG. 4A.

As illustrated in FIG. 4B, the bonding film 50 includes a base material 51 and an adhesive layer 52. The base material 51 is flexible. The base material 51 is, for example, a resin film of polyester, polyurethane, or the like. The base material 51 may be water resistant. The adhesive layer 52 is, for example, an acrylic adhesive material. The base material 51 and the adhesive layer 52 hold the information collection device 20 in contact with the measurement subject. In the example of FIG. 4B, the information collection device 20 is covered by, and sandwiched between, the base material 51 and the adhesive layer 52. The adhesive layer 52 may be adherable to and removable from the measurement subject that is, for example, a human body.

When the information collection device 20 is not in use, the lower surface of the adhesive layer 52 is covered by a protective sheet 53. The protective sheet 53 may be a thin metal film, a resin film including metal particles, or a resin film including magnetic particles of ferrite or the like. The protective sheet 53 shifts the resonance frequency of the resonance circuit 21A (coil L21 and capacitor C21) in the information collection device 20 from the resonance frequency of the resonance circuit 11A (coil L11 and capacitor C11) in the activation device 10. This prevents activation of the information collection device 20 when not in use.

Figure 4C:
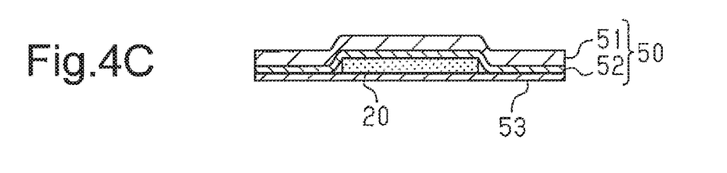
FIG. 4C is a cross-sectional view illustrating another application of the information collection device illustrated in FIG. 1.

With reference to FIG. 4C, when the protective sheet 53 is removed, the lower surface (lower surface of wiring substrate 40 illustrated in FIG. 3B) of the information collection device 20 (module) may be exposed. In this case, the lower surface of the information collection device 20 contacts the surface of the measurement subject.

Comparative Example

A comparative example will now be described.

Same reference numerals are given to those components that are the same in the first embodiment.

Figure 5:
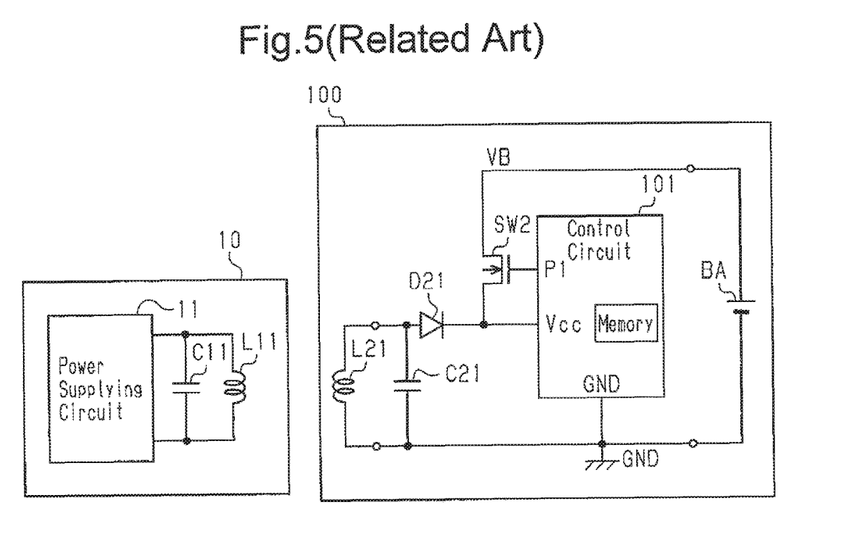
FIGS. 5 and 6 are block circuit diagrams illustrating an information collection device and an activation device in a comparative example.

As illustrated in FIG. 5, in an information collection device 100, one end of a coil L21 is coupled to the power terminal Vcc of a control circuit 101 via a diode D21. Accordingly, the electromotive force generated by the coil L21 is converted to DC power by the diode D21 and supplied to the power terminal Vcc of the control circuit 101. The control circuit 101 is activated by the power voltage supplied to the power terminal Vcc. FIG. 5 does not illustrate the communication circuit 24, the antenna 25, and the sensor 23 of FIG. 1.

Figure 6:
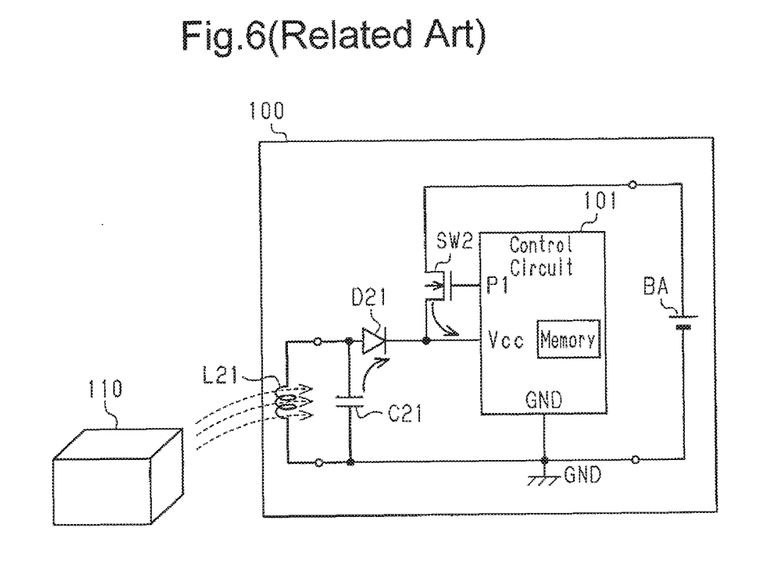

FIG. 6 illustrates a device 110 that generates a magnetic field or an electric field. The device 110 is, for example, a reader/writer device for IC cards or IC tags. The magnetic field or electric field generated by the device 110 generates electromotive force at the coil L21 of the information collection device 100. The electromotive force changes the voltage at the power terminal Vcc of the control circuit 101. Such a voltage change may result in erroneous operation of the control circuit 101.

Operation

The operation of the information collection device 20 will now be described.

The supply of power from the activation device 10 (magnetic field resonance) generates electromotive force at the coil L21 illustrated in FIG. 1. The diode D21 converts the electromotive force to DC power. The control terminal of the switch SW1 (in the present example, P-channel MOS transistor) between the diode D21 (activation circuit 26) and the control circuit 22 is coupled to ground GND via the resistor R21. Accordingly, the switch SW1 goes ON when supplied with DC power. Then, the DC power is supplied via the switch SW1, which has been turned ON, to the power terminal Vcc of the control circuit 22. This activates the control circuit 22.

The activated control circuit 22 outputs the control signal S2 having the voltage Vh from port P1 and turns ON the switch SW2. The power voltage Vcc corresponding to the battery voltage VB of the battery BA is supplied via the switch SW2, which is turned ON, to the power terminal Vcc of the control circuit 22. The control signal S2 having the voltage Vh keeps the switch SW2 turned ON so that the control circuit 22 is continuously operated by the power voltage Vcc supplied from the battery BA.

Further, the control circuit 22 outputs the control signal S1 having the voltage Vh from port P0 to turn OFF the switch SW1. That is, the control circuit 22 electrically decouples the activation circuit 26, which includes the coil L21, the capacitor C21, and the diode D21, from the power terminal Vcc of the control circuit 22. Accordingly, for example, even when the device 110 of FIG. 6 generates electromotive force at the coil L21, the electromotive force does not affect the voltage at the power terminal Vcc. In this manner, changes in the power voltage Vcc are restricted even when electromotive force is generated at the coil L21 subsequent to the activation of the control circuit 22. Accordingly, erroneous operations of the control circuit 22 are reduced.

The first embodiment has the advantages described below.

(1-1) The information collection circuit 21 of the information collection device 20 is coupled to the coil L21. The first terminal of the coil L21 is coupled to the power terminal Vcc of the control circuit 22 via the diode D21 and the switch SW1. The control terminal of the switch SW1 is coupled to ground GND via the resistor R21. The switch SW1 remains ON when the information collection device 20 is inactive. The power terminal Vcc of the control circuit 22 is coupled via the switch SW2 to the positive terminal of the battery BA. The switch SW2 is turned OFF when the information collection device 20 is inactive.

The AC power that flows to the coil L11 of the activation device 10 generates electromotive force at the coil L21. The diode D21 converts the electromotive force to DC power. The DC power is supplied via the switch SW1, which is turned ON, to the power terminal Vcc of the control circuit 22 and activates the control circuit 22. The activated switch SW2 supplies the power terminal Vcc of the control circuit 22 with the power voltage Vcc that corresponds to the battery voltage VB of the battery BA. This allows the information collection device 20 to be activated through contactless transfer without arranging a power switch or exposed contact in the information collection device 20.

Accordingly, unintentional deactivation of the information collection device 20 that may be caused by when a power switch is touched does not occur. Further, there is no need for power switch contacts or exposed contacts. This allows the information collection device 20 to be entirely covered in resin or the like and improves the dustproof and anti-corrosion properties.

(1-2) The activated control circuit 22 turns OFF the switch SW1 with the control signal S1 having the voltage Vh. Even when the device 110 that generates a magnetic field or an electric field generates electromotive force at the coil L21, the switch SW1 is turned OFF. Thus, the DC power generated by the electromotive force is not supplied to the power terminal Vcc of the control circuit 22. In this manner, subsequent to activation of the control circuit 22, changes in the power voltage Vcc caused by the electromotive force generated at the coil L21 may be reduced. This allows erroneous operations of the control circuit 22 to be reduced.

(1-3) The switches SW1 and SW2 are semiconductor switches. Since there are no mechanical contacts, the switches SW1 and SW2 do not go ON and OFF when receiving an impact. This stably supplies the control circuit 22 with the power voltage Vcc from the battery BA and allows the control circuit 22 to stably collect information.

Second Embodiment

A second embodiment will now be described.

Same reference numerals are given to those components that are the same as the corresponding components of the first embodiment. Such components will not be described in detail.

Figure 7:
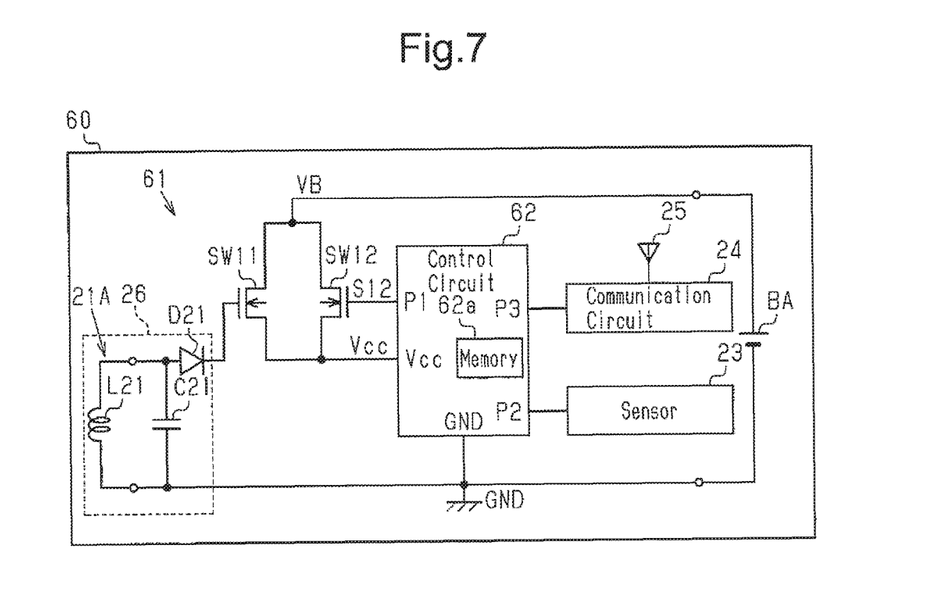
FIG. 7 is a schematic block circuit diagram illustrating a second embodiment of an information collection device.

As illustrated in FIG. 7, an information collection device 60 includes an information collection circuit 61 coupled to a coil L21. The coil L21 includes a first terminal coupled to the anode of the diode D21 and a second terminal coupled to a low potential voltage wiring (ground GND). A capacitor C21 is coupled in parallel to the coil L21. A switch SW11 is coupled to the cathode of the diode D21. The coil L21 and the capacitor C21 form a resonance circuit 21A. The resonance frequency of the resonance circuit 21A is set based on the inductance of the coil L21 and the capacitance of the capacitor C21 to be equal to the resonance frequency of the resonance circuit 11A in the activation device 10.

The switch SW11 is, for example, an N-channel MOS transistor and is one example of a first semiconductor switch. The cathode of the diode D21 is coupled to the control terminal (gate terminal) of the switch SW11. The switch SW11 includes a first terminal (e.g., drain terminal) coupled to the positive electrode of the battery BA and a second terminal (e.g., source terminal) coupled to the power terminal Vcc of the control circuit 62.

The control circuit 62 is, for example, a microcontroller including arithmetic circuits and peripheral circuits. The control circuit 62 includes a memory 62a that stores operation programs of the control circuit 62, primary data used for operations, identification information (ID), and the like. The collected information may be stored in the memory 62a. The control circuit 62, which is activated by the power voltage supplied to the power terminal Vcc (voltage applied to power terminal Vcc, hereafter referred to as the power voltage Vcc using the same reference character), executes the operation programs stored in the memory 62a.

The power terminal Vcc of the control circuit 62 is also coupled to a switch SW12. The switch SW12 is, for example, an N-channel MOS transistor and is one example of a second semiconductor switch. The switch SW12 includes a first terminal (e.g., drain terminal) coupled to the positive terminal of the battery BA. The negative electrode of the battery BA is coupled to ground GND.

Further, the switch SW12 includes a second terminal (e.g., source terminal) that is coupled to the power terminal Vcc of the control circuit 62 and a control terminal (gate terminal) that is coupled to port P1 of the control circuit 62. The control circuit 62 generates a control signal S12 in accordance with the operation state. The switch SW12 goes ON or OFF in response to the control signal S12.

Port P2 of the control circuit 62 is coupled to a sensor 23, which is, for example, a temperature sensor. For example, the information collection device 60 collects biological information and is attached to a human body, which serves as a measurement subject. In this case, the sensor 23 detects the body temperature of the human body as the biological information (information of measurement subject) and generates a detection signal in accordance with the detected temperature. The control circuit 62 collects the biological information (i.e., body temperature) from the detection signal of the sensor 23.

In lieu of, or in addition to, the body temperature, the electrical activity of the heart (electrocardiogram), pulse, brain waves, respiratory rate, perspiration, and the like may be collected as the biological information. FIG. 7 illustrates only one sensor 23. However, a plurality of sensors 23 may be coupled to the control circuit 62 in accordance with the type of the collected information or the location where the information is collected.

Port P3 of the control circuit 62 is coupled to a communication circuit 24. An antenna 25 is coupled to the communication circuit 24, which is, for example, a transmission circuit. The control circuit 62 sends transmission information, which includes the biological information collected by the sensor 23, to the communication circuit 24. The communication circuit 24 transmits the transmission information from the antenna 25. The communication circuit 24 transmits signals at a frequency of, for example, 2.4 GHz.

A process for activating the information collection device 60 will now be described.

When the battery BA is not coupled, the control circuit 62 is not supplied with the power voltage Vcc (Vcc=0) and is thus inactive.

When the battery BA is coupled, the battery voltage VB is supplied to the switches SW11 and SW12. When electromotive force is not generated at the coil L21, the potential at the control terminal of the switch SW11 has a low level (ground GND level). Thus, the switch SW11 is turned OFF. Since the control circuit 62 is inactive, the voltage at the control terminal of the switch SW12 has a low level (ground GND level). Thus, the switch SW12 is turned OFF.

The activation device 10 (refer to FIG. 1) supplies AC power to the coil L11 from the power supplying circuit 11 constantly or when a switch (not illustrated) of the activation device 10 is operated. The AC power generates electromotive force (AC power) at the coil L21 of the information collection device 60. The diode D21 rectifies the AC power and generates DC power (i.e., DC voltage), which is supplied to the control terminal of the switch SW11.

The switch SW11 is an N-channel MOS transistor. Thus, the switch SW11 goes ON when supplied with DC power from the diode D21. The power voltage Vcc, which corresponds to the battery voltage VB of the battery BA, is supplied via the switch SW11, which is turned ON, to the power terminal Vcc of the control circuit 62. In this manner, the control circuit 62 is activated by the battery voltage VB (first power voltage) supplied via the switch SW11.

The activated control circuit 62 outputs the control signal S12 at a given voltage Vh from port P1. The voltage Vh of the control signal S12 has a level that keeps the switch SW12 turned ON. In the second embodiment, the switch SW12 is an N-channel MOS transistor. Accordingly, the control circuit 62 generates the control signal S12 having a voltage Vh that is higher than the voltage at the first terminal of the switch SW12 (in the present example, battery voltage VB supplied to drain terminal) by a threshold value voltage Vthn of the switch SW12. For example, the control circuit 62 includes a step-up circuit that generates the necessary voltage. The step-up circuit may be, for example, a switching circuit, a charge pump circuit, or a bootstrap circuit.

The switch SW12 goes ON in response to the control signal S12 (voltage Vth). The control circuit 62 is supplied with power voltage Vcc (second power voltage), which corresponds to the battery voltage VB of the battery BA, via the switch SW12 that is turned ON. The power voltage Vcc (battery voltage VB) continuously operates the control circuit 62.

The operational states of the information collection device 60 will now be described.

Figure 8:
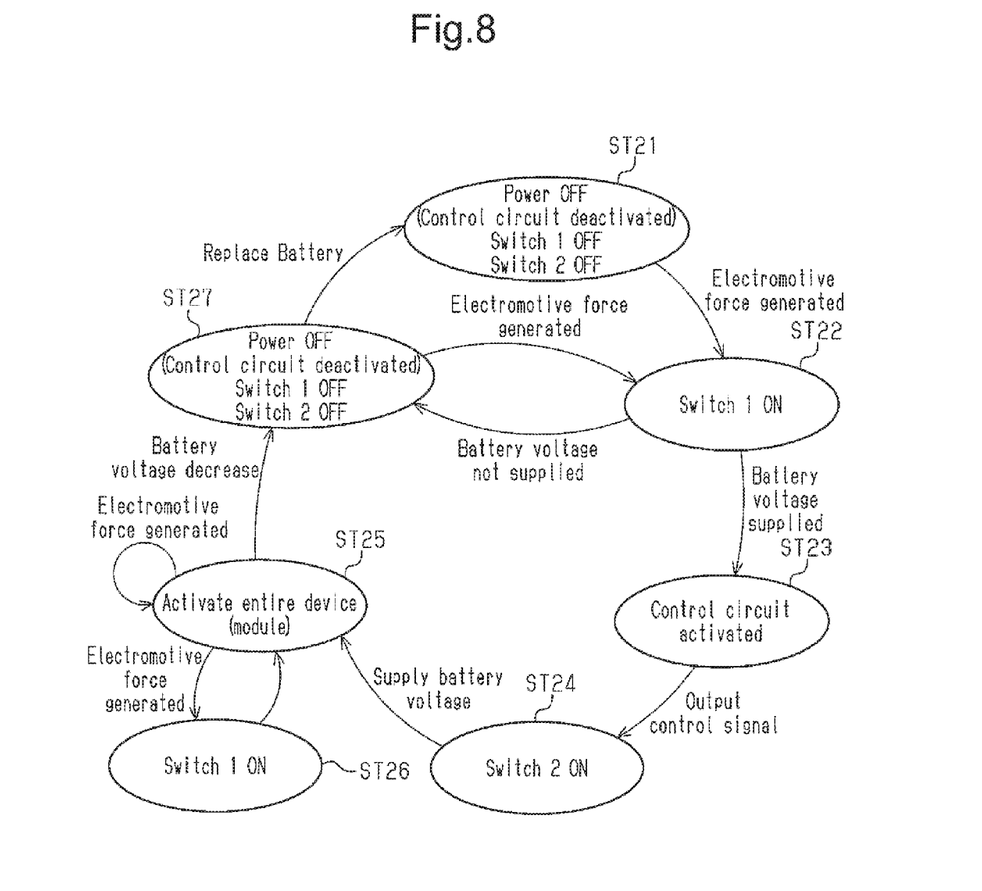
FIG. 8 is a chart illustrating the operation of the information collection device illustrated in FIG. 1.

In FIG. 8, state ST21 indicates an initial state. In this state, the power supply of the information collection device 60 is deactivated. Accordingly, the switch SW12 illustrated in FIG. 7 is in a non-controlled state. In FIG. 8, the switch SW11 is indicated as "Switch 1", and the switch SW12 is indicated as "Switch 2". The control terminal of the switch SW11 is coupled to the cathode of the diode D21 and thus has a low level (ground GND level). Accordingly, the switch SW11 is turned OFF. The switch SW12 is also turned OFF. Further, in this state, the battery BA of the information collection device 60 is able to supply the control circuit 62 and the like with sufficient (operation enabling) battery voltage VB.

When electromotive force is generated at the coil L21, the electromotive force (DC power) turns ON the switch SW11 (state ST22). Accordingly, the power terminal Vcc of the control circuit 62 is supplied with the battery voltage VB of the battery BA, and the control circuit 62 is activated (state ST23). The activated control circuit 62 outputs the control signal S12 having the voltage Vh, and the control signal S12 turns ON the switch SW12 (state ST24).

The switch SW12, which has been turned ON, supplies the control circuit 62 with the battery voltage VB from the battery BA. The power voltage Vcc, which corresponds to the battery voltage VB, activates the entire information collection device 60 (state ST25). Then, when the electromotive force is depleted at the coil L21, the voltage at the control terminal of the switch SW11 decreases and the switch SW11 goes OFF.

In state ST25, the control circuit 62 of the information collection device 60 transmits the information collected by the sensor 23 from the communication circuit 24 and the antenna 25.

In state ST25, noise may generate electromotive force at the coil L21. The electromotive force may change the voltage at the control terminal of the switch SW11.

In the second embodiment, the switch SW11 is an N-channel MOS transistor. Accordingly, to turn ON the switch SW11, the control terminal of the switch SW11 needs to be supplied with a voltage that is higher than the voltage level at the source terminal by a threshold value voltage Vthn of the switch SW11 (N-channel MOS transistor). Thus, when the DC voltage obtained by rectifying the electromotive force generated at the coil L21 with the diode D21 is lower than the necessary voltage, the switch SW11 is turned OFF.

When the DC voltage rectified and obtained by the diode D21 is higher than the necessary voltage, the switch SW11 goes ON (state ST26). In this case, the output current of the battery BA is supplied to the control circuit 62 via the two switches SW11 and SW12, which are coupled in parallel to each other. Thus, the power voltage Vcc does not change at the power terminal Vcc of the control circuit 62. That is, the power terminal Vcc of the control circuit 62 is continuously supplied with the battery voltage VB. When the electromotive force is depleted at the coil L21, the switch SW11 goes OFF, and the information collection device 60 shifts to state ST25.

When the battery voltage VB decreases to be lower than the operable voltage range of the control circuit 62, the information collection device 60 shifts to state ST27 and deactivates the power supply. In state ST27, the control circuit 62 is deactivated. Accordingly, the switch SW12 is in a non-controlled state. That is, the switches SW11 and SW12 both go OFF.

In the deactivated state (state ST27), noise may generate electromotive force at the coil L21. In such a case, the information collection device 60 shifts to state ST22, and the electromotive force turns ON the switch SW11. However, the information collection device 60 is not supplied with the battery voltage VB via the switch SW11. Thus, the information collection device 60 shifts to state ST27 and deactivates the power supply.

In state ST27, when the battery BA is replaced, the information collection device 60 shifts to state ST21 (initial state). In this manner, the information collection device 60 is reused by replacing the battery BA.

Operation

Operation of the information collection device 60 will now be described.

The supply of power from the activation device 10 (magnetic field resonance) generates electromotive force at the coil L21 illustrated in FIG. 1. The diode D21 converts the electromotive force to DC power. The DC power turns ON the switch SW11. The switch SW11, which is turned ON, supplies the power terminal Vcc of the control circuit 62 with the power voltage Vcc, which corresponds to the battery voltage VB. This activates the control circuit 62.

The activated control circuit 62 outputs the control signal S12 having the voltage Vh from port P1 and turns ON the switch SW12. The power voltage Vcc corresponding to the battery voltage VB of the battery BA is supplied via the switch SW12, which has been turned ON, to the power terminal Vcc of the control circuit 62. The control circuit 62 keeps the switch SW12 turned ON with the control signal S12 having the voltage Vh. Thus, the control circuit 62 is continuously operated by the power voltage Vcc supplied from the battery BA.

In the second embodiment, the switch SW11 is an N-channel MOS transistor. Accordingly, to turn ON the switch SW11, the control terminal of the switch SW11 needs to be supplied with a voltage that is higher than the voltage level at the source terminal by a threshold value voltage Vthn of the switch SW11 (N-channel MOS transistor). Thus, when the DC voltage obtained by rectifying the electromotive force generated at the coil L21 with the diode D21 is lower than the necessary voltage, the switch SW11 is turned OFF. Accordingly, the power voltage Vcc at the power terminal Vcc of the control circuit 62 does not change.

When the DC voltage rectified and obtained by the diode D21 is higher than the necessary voltage, the switch SW11 goes ON (state ST26 illustrated in FIG. 8). In this case, the output current of the battery BA is supplied to the control circuit 62 via the two switches SW11 and SW12, which are coupled in parallel to each other. Thus, the power voltage Vcc does not change or changes only slightly at the power terminal Vcc of the control circuit 62.

In this manner, changes in the power voltage Vcc at the power terminal Vcc of the control circuit 62 are restricted in the second embodiment.

As described above, the second embodiment has the advantages described below in addition to the advantages of the first embodiment.

(2-1) The switch SW11, which is coupled between the battery BA and the power terminal Vcc of the control circuit 62, is turned ON by the electromotive force generated at the coil L21. The control circuit 62 is supplied with the power voltage Vcc, which corresponds to the battery voltage VB, via the switch SW11 that is turned ON. Thus, the control circuit 62 is supplied with stable power voltage Vcc when activated.

(2-2) The switch SW11 is coupled between the battery BA and the power terminal Vcc of the control circuit 62. The switch SW12 is also coupled between the battery BA and the power terminal Vcc of the control circuit 62. The control circuit 62 turns ON the switch SW12 subsequent to activation. After the information collection device 60 (control circuit 62) is activated, when the electromotive force generated at the coil L21 turns ON the switch SW11, the battery voltage VB is supplied to the power terminal Vcc of the control circuit 62 via the switches SW11 and SW12, which are coupled in parallel. Accordingly, the voltage at the power terminal Vcc of the control circuit 62 does not change or changes only slightly. This reduces changes in the power voltage Vcc.

It should be apparent to those skilled in the art that the foregoing embodiments may be employed in many other specific forms without departing from the spirit or scope of this disclosure. Particularly, it should be understood that the foregoing embodiments may be employed in the following forms.

In each of the above embodiments, a non-contact power supplying technique such as electromagnetic induction may be employed to supply power to the information collection device from the activation device and activate the information collection device (control circuit) with the power.

In each of the above embodiments, MOS transistors are used as the switches SW1, SW2, SW11, and SW22. Instead, bipolar transistors may be used. Alternatively, MOS transistors may be used in combination with bipolar transistors.

In each of the above embodiments, biological information is collected from the human body. However, the measurement subject is not limited to the human body and may be collected from other living bodies. For example, information may be collected from a pet such as a dog or a cat, livestock such as a cow or a pig, or any other breed animal.

In each of the above embodiments, biological information is collected. However, the information of the measurement subject is not limited to biological information. For example, the information collection device may collect environmental information. The environmental information may be, for example, temperature, noise (sound), gas concentration, acceleration, vibration, or the like.

In each of the above embodiments, the coil L21 is formed on the lower surface of the wiring substrate 40 as illustrated in FIG. 3B but may be formed on the upper surface of the wiring substrate 40.

In each of the above embodiments, the configurations of the switches SW1, SW2, SW11, and SW12 may be changed.

Figure 9:
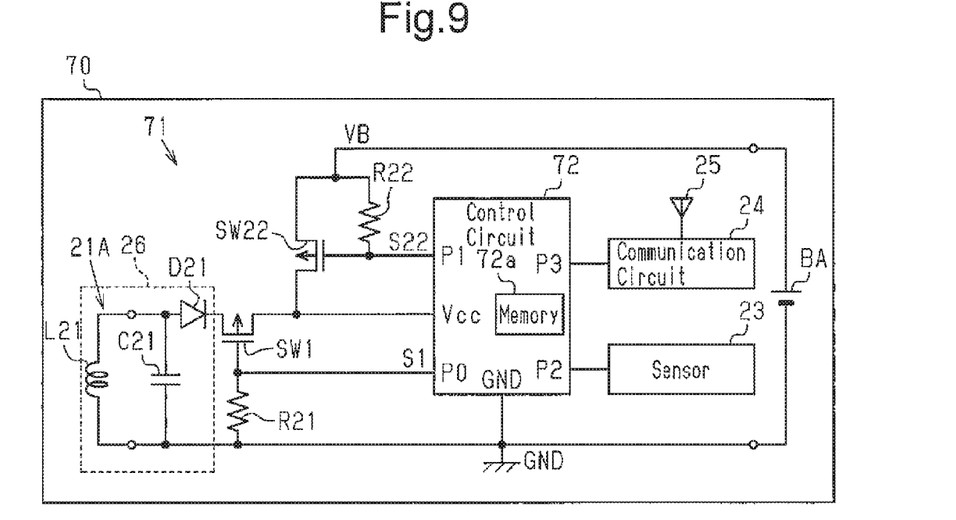
FIG. 9 is a schematic block circuit diagram illustrating a further information collection device.

For example, FIG. 9 illustrates an information collection device 70 provided with an information collection circuit 71 that includes a switch SW22 and a resistor R22 instead of the switch SW2 of FIG. 1. The switch SW22 is, for example, a P-channel MOS transistor. The switch SW22 includes a first terminal (source terminal) coupled to the battery BA, a second terminal (drain terminal) coupled to the power terminal Vcc of a control circuit 72, and a control terminal (gate terminal) coupled to port P1 of the control circuit 72. The resistor R22 is coupled between the first terminal and the control terminal of the switch SW22.

The resistor R22 pulls up the voltage at the control terminal of the switch SW2 based on the battery voltage VB of the battery BA. Accordingly, the switch SW22 is turned OFF when the control circuit 72 is inactive.

In the same manner as the control circuit 22 of the first embodiment, the control circuit 72 is activated by the power voltage Vcc (DC voltage) supplied via the switch SW1, and the control circuit 72 outputs the control signal S22 having the low level (e.g., ground GND level) based on an operation program stored in a memory 72a. The low level control signal S22 turns ON the switch SW22. The switch SW22, which is turned ON, supplies the control circuit 72 with the power voltage Vcc that corresponds to the battery voltage VB. The control circuit 72 outputs the control signal S1 at a given voltage level (e.g., voltage Vh) and turns OFF the switch SW1. In this case, the control circuit 72 may generate the control signal S1 at the level of the power voltage Vcc (battery voltage VB).

The switch SW12 of the second embodiment may be replaced by the switch SW22 and the resistor R22 illustrated in FIG. 9.

In each of the above embodiments and modified examples, the communication circuit 24 may receive a command signal or the like from an external device. The control circuits 22, 62, and 72 store the collected information in the memories 22a, 62a, and 72a. In response to a command signal received via the communication circuit 24 from the external device, the control circuits 22, 62, and 72 may read the collected information from the memories 22a, 62a, and 72a and transmit the read information from the communication circuit 24.

In each of the above embodiments and modified examples, the collected information may be stored in a recording medium such as a compact memory card. For example, when replacing the battery BA, the recording medium is removed from the information collection device, and the data (collected information) stored in the recording medium is transferred to the information management device. This eliminates the need for the communication circuit 24 to constantly perform communication and reduces power consumption. Thus, the usage duration of the battery BA may be prolonged.

Clauses

This disclosure encompasses the following embodiments.

1. An information collection circuit including:

a detection circuit that generates a detection signal in accordance with information of a measurement subject;

a control circuit that collects the information of the measurement subject from the detection signal of the detection circuit;

a rectification circuit that rectifies electromotive force generated at a coil;

a first semiconductor switch including
a first terminal coupled to the rectification circuit,
a second terminal coupled to a power terminal of the control circuit, and
a control terminal coupled to a ground wiring and a first port of the control circuit, wherein the first semiconductor switch goes ON in response to a DC voltage supplied from the rectification circuit; and
a second semiconductor switch including
a first terminal supplied with a battery voltage,
a second terminal coupled to the power terminal of the control circuit, and
a control terminal coupled to a second port of the control circuit,
wherein the control circuit is activated by the DC voltage supplied via the first semiconductor switch, and subsequent to activation, the control circuit outputs a first control signal having a first voltage from the first port to turn OFF the first semiconductor switch so as to electrically decouple the rectification circuit from the power terminal, and outputs a second control signal having the first voltage from the second port to turn ON the second semiconductor switch so as to receive the battery voltage via the second semiconductor switch.

2. An information collection circuit including:
a detection circuit that generates a detection signal in accordance with information of a measurement subject;
a control circuit that collects the information of the measurement subject from the detection signal of the detection circuit;
a rectification circuit that rectifies electromotive force generated at a coil;
a first semiconductor switch including
a control terminal coupled to the rectification circuit,
a first terminal supplied with a battery voltage, and
a second terminal coupled to a power terminal of the control circuit,
wherein the first semiconductor switch goes ON in response to a DC voltage supplied from the rectification circuit; and
a second semiconductor switch including
a control terminal coupled to a control port of the control circuit,
a first terminal supplied with the battery voltage, and
a second terminal coupled to the power terminal of the control circuit,
wherein the control circuit is activated by the battery voltage supplied via the first semiconductor switch, and subsequent to activation, the control circuit outputs a control signal having a first voltage from the control port to turn ON the second semiconductor switch so as to receive the battery voltage via the second semiconductor switch.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to an illustration of the superiority and inferiority of the invention. Although embodiments have been described in detail, it should be understood that various changes, substitutions, and alterations could be made hereto without departing from the spirit and scope of the invention.

The invention claimed is:
1. An information collection circuit that collects information of a measurement subject, the information collection circuit comprising:
a detection circuit that generates a detection signal in accordance with the information of the measurement subject;
a control circuit that collects the information of the measurement subject from the detection signal of the detection circuit;
a rectification circuit that rectifies electromotive force generated at a coil by an external magnetic field or an external electric field;
a first semiconductor switch including a first terminal coupled to the rectification circuit, a second terminal coupled to a power terminal of the control circuit, and a control terminal coupled to the control circuit and coupled via a resistor to a wiring having a ground level, wherein the first terminal and the second terminal are electrically coupled to each other when the control circuit is inactive and wherein the first semiconductor switch becomes conductive based on a DC voltage generated by the rectification circuit; and
a second semiconductor switch coupled between the power terminal of the control circuit and a battery, wherein the second semiconductor switch becomes conductive based on a control signal provided from the control circuit to a control terminal of the second semiconductor switch, and the second semiconductor switch is non-conductive when the control circuit is inactive,
wherein the control circuit is activated by a first power voltage supplied via the first semiconductor switch to control the second semiconductor switch to become conductive, and the control circuit is operated based on a second power voltage supplied from the battery via the second semiconductor switch, which has become conductive, to collect the information of the measurement subject.

2. The information collection circuit according to claim 1, wherein
after controlling the second semiconductor switch to be conductive, the control circuit provides a control signal to the control terminal of the first semiconductor switch to control the first semiconductor switch to be non-conductive.

3. The information collection circuit according to claim 1, further comprising:
a communication circuit coupled to the control circuit; and
an antenna coupled to the communication circuit,
wherein the control circuit transmits transmission information including the collected information of the measurement subject via the communication circuit and the antenna.

4. An information collection module that collects information of a measurement subject, the information collection module comprising:
a wiring substrate;
an information collection circuit mounted on a wiring substrate;
a battery that supplies battery voltage to the information collection circuit; and
a coil formed on the wiring substrate to generate electromotive force from an external magnetic field or an external electric field,
wherein the information collection circuit includes
a detection circuit that generates a detection signal in accordance with the information of the measurement subject,
a control circuit that collects the information of the measurement subject from the detection signal of the detection circuit, a rectification circuit that rectifies the electromotive force generated at the coil, a first semiconductor switch including a first terminal coupled to the rectification circuit, a second terminal coupled to a power terminal of the control circuit, and a control terminal coupled to the control circuit and coupled via a resistor to a wiring having a ground level, wherein the first terminal and the second terminal are electrically coupled to each other when the control circuit is inactive and wherein the first semiconductor switch becomes conductive based on a DC voltage generated by the rectification circuit, and a second semiconductor switch coupled between the power terminal of the control circuit and the battery, wherein the second semiconductor switch becomes conductive based on a control signal provided from the control circuit to a control terminal of the second semiconductor switch, and the second semiconductor switch is non-conductive when the control circuit is inactive, and wherein the control circuit is activated by a first power voltage supplied via the first semiconductor switch to control the second semiconductor switch to become conductive, and the control circuit is operated based on a second power voltage supplied from the battery via the second semiconductor switch, which has become conductive, to collect the information of the measurement subject.

5. An information collection circuit that collects information of a measurement subject, the information collection circuit comprising:

a detection circuit that generates a detection signal in accordance with the information of the measurement subject;

a control circuit that collects the information of the measurement subject from the detection signal of the detection circuit;

a rectification circuit that rectifies electromotive force generated at a coil by an external magnetic field or an external electric field;

a first semiconductor switch coupled between the rectification circuit and a power terminal of the control circuit, wherein the first semiconductor switch becomes conductive based on a DC voltage generated by the rectification circuit; and a second semiconductor switch coupled between the power terminal of the control circuit and a battery, wherein the second semiconductor switch becomes conductive based on a control signal provided from the control circuit to a control terminal of the second semiconductor switch, and the second semiconductor switch is non-conductive when the control circuit is inactive, wherein the control circuit is activated by a first power voltage supplied via the first semiconductor switch to control the second semiconductor switch to become conductive, and the control circuit is operated based on a second power voltage supplied from the battery via the second semiconductor switch, which has become conductive, to collect the information of the measurement subject, and wherein the first semiconductor switch is coupled in parallel to the second semiconductor switch, a control terminal of the first semiconductor switch is connected to the rectification circuit and supplied with the DC voltage generated by the rectification circuit, and the control terminal of the second semiconductor switch is connected to the control circuit.

6. The information collection circuit according to claim 5, further comprising:

a communication circuit coupled to the control circuit; and an antenna coupled to the communication circuit, wherein the control circuit transmits transmission information including the collected information of the measurement subject via the communication circuit and the antenna.

7. An information collection module that collects information of a measurement subject, the information collection module comprising:

a wiring substrate;

an information collection circuit mounted on a wiring substrate;

a battery that supplies battery voltage to the information collection circuit; and a coil formed on the wiring substrate to generate electromotive force from an external magnetic field or an external electric field, wherein the information collection circuit includes a detection circuit that generates a detection signal in accordance with the information of the measurement subject, a control circuit that collects the information of the measurement subject from the detection signal of the detection circuit, a rectification circuit that rectifies the electromotive force generated at the coil, a first semiconductor switch coupled between the rectification circuit and a power terminal of the control circuit, wherein the first semiconductor switch becomes conductive based on a DC voltage generated by the rectification circuit, and a second semiconductor switch coupled between the power terminal of the control circuit and the battery, wherein the second semiconductor switch becomes conductive based on a control signal provided from the control circuit to a control terminal of the second semiconductor switch, and the second semiconductor switch is non-conductive when the control circuit is inactive, wherein the control circuit is activated by a first power voltage supplied via the first semiconductor switch to control the second semiconductor switch to become conductive, and the control circuit is operated based on a second power voltage supplied from the battery via the second semiconductor switch, which has become conductive, to collect the information of the measurement subject, and wherein the first semiconductor switch is coupled in parallel to the second semiconductor switch, a control terminal of the first semiconductor switch is connected to the rectification circuit and supplied with the DC voltage generated by the rectification circuit, and the control terminal of the second semiconductor switch is connected to the control circuit.

* * * * *